(12) United States Patent
Lahtinen

(10) Patent No.: US 10,605,230 B1
(45) Date of Patent: Mar. 31, 2020

(54) WIND TURBINE ASSEMBLY

(71) Applicant: Stuart Lahtinen, Eagle Point, OR (US)

(72) Inventor: Stuart Lahtinen, Eagle Point, OR (US)

(*) Notice: Subject to any disclaimer, the term of this patent is extended or adjusted under 35 U.S.C. 154(b) by 22 days.

(21) Appl. No.: 15/896,174

(22) Filed: Feb. 14, 2018

Related U.S. Application Data

(60) Provisional application No. 62/459,668, filed on Feb. 16, 2017, provisional application No. 62/526,852, filed on Jun. 29, 2017.

(51) Int. Cl.
| | | |
|---|---|---|
| *F03D 9/25* | (2016.01) | |
| *F03D 3/00* | (2006.01) | |
| *H02K 7/18* | (2006.01) | |
| *F03D 80/80* | (2016.01) | |
| *F03D 15/20* | (2016.01) | |

(52) U.S. Cl.
CPC .............. *F03D 9/25* (2016.05); *F03D 3/005* (2013.01); *F03D 15/20* (2016.05); *F03D 80/82* (2016.05); *H02K 7/183* (2013.01)

(58) Field of Classification Search
CPC .......... F03D 15/20; F03D 80/82; F03D 3/005; F03D 9/25; H02K 7/183
USPC ...................................... 290/55, 44
See application file for complete search history.

(56) References Cited

U.S. PATENT DOCUMENTS

| | | |
|---|---|---|
| 2,431,111 A | 12/1943 | Du Brie |
| 2,436,747 A | 10/1944 | Du Brie |
| 4,245,958 A | 1/1981 | Ewers |
| 4,525,642 A | 6/1985 | Humphries et al. |
| 4,672,252 A | 6/1987 | Spirk |
| 6,781,276 B1 | 8/2004 | Stiesdal et al. |
| 7,109,625 B1 | 9/2006 | Jore et al. |
| 7,740,448 B2 | 6/2010 | Meyer et al. |
| 8,022,581 B2 | 9/2011 | Stiesdal |
| 8,063,500 B2 | 11/2011 | Minami et al. |
| 8,084,876 B2 | 12/2011 | Rasmusen |
| 8,552,613 B2 | 10/2013 | Stiesdal |
| 8,653,685 B2 | 2/2014 | Garcia |
| 8,847,423 B2 | 9/2014 | Wang |
| 8,933,571 B2 | 1/2015 | Grinblat |
| 9,172,321 B2 | 10/2015 | Thisted et al. |
| 9,222,461 B2 | 12/2015 | Aranovich et al. |
| 9,418,795 B2 | 8/2016 | Snyder |
| 9,431,944 B2 | 8/2016 | Gregg et al. |
| 9,680,306 B2 | 1/2017 | Xue et al. |
| 2009/0220342 A1 | 9/2009 | Wu et al. |

(Continued)

FOREIGN PATENT DOCUMENTS

| | | |
|---|---|---|
| EP | 1914866 | 4/2008 |
| EP | 2894765 | 7/2015 |

*Primary Examiner* — Charles Reid, Jr.
(74) *Attorney, Agent, or Firm* — Jerry Haynes Law

(57) ABSTRACT

The present invention disclosure describes an integrated rotary wind turbine and electrical generating device that uses electrical current conductors such as a plurality of parallel plate capacitors or a plurality of wire equivalent sheets in combination with a plurality of magnets, stator, rotatable substructure, wind collectors, etc. to generate electricity. The turbine assembly simplifies the construction, reduces weight, reduces cost and improves heat dissipation of the assembly. It is also more environmentally friendly and amenable to use in isolated applications and as part of a highly distributed micro-grid.

20 Claims, 9 Drawing Sheets

(56) References Cited

U.S. PATENT DOCUMENTS

| | | | |
|---|---|---|---|
| 2009/0256431 A1* | 10/2009 | Stiesdal | H02K 1/04 310/45 |
| 2010/0052330 A1* | 3/2010 | Rasmusen | H02K 1/02 290/55 |
| 2011/0204638 A1 | 8/2011 | Lahtinen | |
| 2011/0272224 A1 | 11/2011 | Yan et al. | |
| 2011/0285138 A1* | 11/2011 | Asanuma | H02K 1/148 290/55 |
| 2014/0099204 A1 | 4/2014 | Debleser | |
| 2014/0117948 A1 | 5/2014 | Yasugi et al. | |
| 2015/0008671 A1 | 1/2015 | Palomares Rentero et al. | |
| 2015/0233347 A1 | 8/2015 | Yan | |
| 2016/0061187 A1 | 3/2016 | Aranovich et al. | |
| 2016/0094154 A1* | 3/2016 | Post | H02N 1/08 318/116 |
| 2016/0099570 A1 | 4/2016 | The' | |
| 2016/0237989 A1 | 8/2016 | Abdallah | |
| 2016/0241153 A1 | 8/2016 | Abeyasekera et al. | |
| 2017/0110258 A1 | 4/2017 | Snyder | |

* cited by examiner

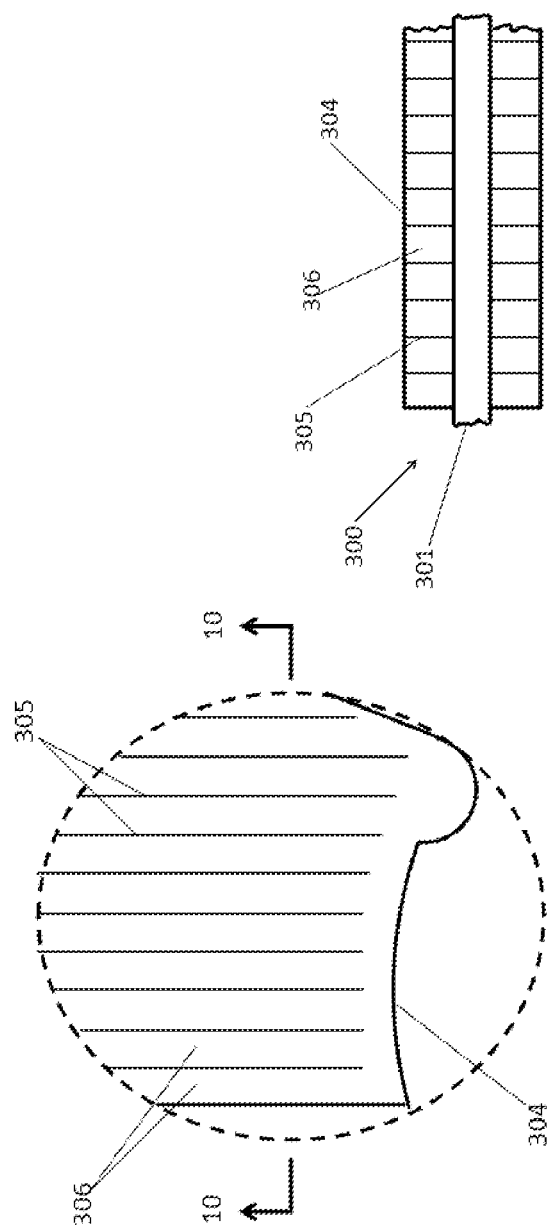

WIND TURBINE ASSEMBLY

CROSS-REFERENCES TO RELATED APPLICATIONS

This application claims priority from U.S. Provisional Application Ser. No. 62/459,668, entitled "Electromagnetic Inductive Wind Turbine Apparatus", filed on Feb. 16, 2017 and U.S. Provisional Application Ser. No. 62/526,852 entitled "Integrated Capacitance Wind Turbine Assembly" filed on Jun. 29, 2017, which applications are hereby incorporated herein by reference in their entirety.

FIELD OF THE INVENTION

The present invention relates generally to a wind turbine assembly. More so, it relates to an integrated capacitance wind turbine assembly and an integrated wire equivalent wind turbine assembly to generate electricity without using conventional wire windings.

BACKGROUND OF THE INVENTION

Wind turbines for generating electricity in their most basic form comprise a rotor having blades, scoops or other means of creating drag against moving wind to rotate the rotor, a drive shaft rotated by the rotor and a generator converting the rotational energy of the rotor to electrical energy. An electrical generator in its most basic form typically generates electricity using the rotational energy of the rotor to rotate, via the drive shaft, permanent magnets contained within the generator near fixed wire windings also contained within the generator. Rotating the permanent magnets near the fixed wire windings allows the magnetic field generated by the permanent magnets to act on the fixed wire windings thereby generating electrical current in the wire windings. Typically, wind turbines fall into two general categories: horizontal axis wind turbines in which the rotor rotates about a horizontal axis parallel to the ground and vertical axis wind turbines in which the rotor rotates about a vertical axis perpendicular to the ground.

Beyond the mechanical limitations of conventional wind turbines, the aesthetic appearance of conventional wind turbines is often a major hindrance to their widespread use, particularly in densely populated urban areas. Large horizontal axis wind turbines typically require tall supports to provide sufficient clearance to rotate the blades as well as requiring 360 degree clearance so as to allow the rotor assembly to compensate for changing wind directions. The height of horizontal axis wind turbines and the large clearance required often limit the use of horizontal axis wind turbines to low population density areas such as rural areas. The noise created by these large turbine blades can be objectionable which also limits the areas where they can be used. Finally the large rotating blades of horizontal axis wind turbines are responsible for the deaths of numerous migrating birds and bats. Estimates of the number of birds killed annually by wind turbines in the United States run up to 500,000.

While a number of solutions have been proposed to address these technical and aesthetic problems, the solutions themselves often require complex and costly mechanical systems that require significant maintenance and often significantly increase the size and weight of the overall wind turbine. Similarly, such mechanical systems will decrease the efficiency of the overall wind turbine by adding additional friction to the system. As such, there is a need for a simple yet effective solution to address these technical and aesthetic problems which the present invention described herein does.

Numerous innovations have been provided in the prior art that are adapted to wind turbines. Even though these innovations may be suitable for the specific purposes to which they address, however, they would not be as suitable for the purposes of the present invention.

For example, U.S. Patent Application No. 2011/0204638 to Lahtinen discloses a wind turbine that includes a rotatable substructure rotating about a vertical axis and a base assembly. A plurality of wind collectors are affixed to the periphery of the rotatable substructure and provide drag against wind passing the wind turbine to rotate the rotatable substructure. A plurality of permanent magnets is affixed to the rotatable substructure and rotates as the rotatable substructure turns. A plurality of wire windings are affixed to the base assembly such that the wire windings are exposed to magnetic fields of the permanent magnets as the substructure is rotated to generate an electrical current.

U.S. Patent Application No. 2014/0117,948 to Yasugi et al. teaches a voltage control method for a voltage control apparatus to be used in a generator system that includes a wind turbine generator having a switching device for controlling a generator; and a capacitor bank for improving power factor provided between the wind turbine generator and a utility grid U.S. Patent Application No. 2015/0008,671 to Palomares Rentero et al. teaches a wind turbine pitch drive system comprising an electric grid for supplying electrical power, a motor for driving a pitch actuator, an electronic converter for controlling the motor and a back-up energy storage unit for supplying electrical power. The electronic converter comprises a DC-link capacitor bank.

U.S. Pat. No. 9,172,321 to Thisted et al. describes an electrical yaw drive for a wind turbine that includes a wind turbine nacelle and a wind turbine tower. The electrical yaw drive has an asynchronous motor, an excitation capacitor bank and dump loads, which are electrically connectable to windings of the asynchronous motor.

U.S. Pat. No. 9,431,944 to Gregg et al. discloses a wind turbine and generator arrangement comprising a turbine that drives a self-excited induction generator via a shaft and mechanical gearbox. The induction generator includes an electrical circuit that includes a variable capacitance that constitutes a fixed capacitor and a triac under the control of a controller, or by a bank of capacitors switched by a relay under control of the controller.

U.S. Pat. No. 7,825,562 to Naganawa et al. discloses a distribution winding stator using a coil for a rectangular conductor. A conductive wire of a rectangular shape in cross section is double-wound, and is allowed to be shifted by the whole width of the wire having double-wound the crowns of both ends, and is formed to crank shape so as to become a length within the range of the intervals of the adjacent slots, so that the conductive wire is formed by being inserted into the slot of the stator.

It is apparent now that numerous innovations that are adapted to wind turbines and methods for generating electricity have been developed in the prior art that are adequate for various purposes. Furthermore, even though these innovations may be suitable for the specific purposes to which they address, accordingly, they would not be suitable for the purposes of the present invention as heretofore described. Thus an integrated capacitance wind turbine assembly and an integrated wire equivalent wind turbine assembly to generate electricity without using conventional wire windings are needed.

SUMMARY OF THE INVENTION

The fundamental goal of the present invention is to provide a more cost efficient turbine/generator through more economical design and construction which is more environmentally compatible than current designs. Ideally this compact design should be adaptable to use in highly distributed micro-grids or for more isolated uses such as electric vehicle charging stations. These design goals are accomplished by using methodologies which require far less conductive material per unit of electrical energy generated as compared to typical generators composed of wire windings. Two preferred embodiments are presented as examples, wherein both of the embodiments describe use of relatively standard rotors containing permanent magnets used to energize the conductive material of the stator. The primary advantage of these embodiments lies in the use of unique stator configurations which eliminate the use of conventional round wire windings with their attendant disadvantages.

The first embodiment uses a stator comprised of parallel plate capacitors wired in such a way as to immediately harness the current generated by the developing potential difference between the plates of the capacitors.

The second embodiment uses sheets of conductive material which are slotted through the full sheet thickness so as to create a stator containing a series of square or rectangular wire equivalents. In the detailed description it will be evident that a great deal of the conductive material used in the stator has been removed when this design is compared to a heretofore standard stator composed of wire windings.

In the case of each of the embodiments referenced above the elimination of the air spaces inherently present between the round wire windings of a standard stator provides two important advantages. First, the design is much more compact making more efficient use of space and second, the design allows heat to dissipate more effectively which will reduce the operating temperature and extend the useful life of the generator. Finally the complexity of producing wire windings is eliminated in favor of much more simple construction techniques.

The embodiments described above are very amenable to a vertical axis design which has several useful features. Because the wind capturing devices lie in a horizontal plane there is never any need for them to search for the optimal orientation to the wind direction because they are always directed into the wind. The compact nature of this concept decreases inertia which will lead to an increased ability to generate electrical current at lower wind speeds. This more compact configuration also eliminates the large spinning blades with their high tip speed that is noisy and too often deadly to flying birds and bats.

According to an aspect of the present invention, an integrated capacitance wind turbine assembly is provided, the assembly includes a base member comprising a central support; a rotatable substructure circumferentially disposed around the central support of the base member, wherein the rotatable substructure comprising a plurality of wind collectors affixed to the periphery of the rotatable substructure, the plurality of wind collectors creating a drag against wind passing the assembly, whereby wind causes the rotatable substructure to rotate; a stator mounted onto the central support of the base member and disposed in a cavity of the rotatable substructure, thereby allowing free rotation of the rotatable substructure around the stator; a plurality of magnets with opposite polarities are disposed on either side of the stator, further the plurality of magnets having alternating north and south poles facing perpendicular to the stator on each side of the stator; a plurality of parallel plate capacitors connected to each other and disposed on the surface of the stator base plate, wherein the parallel plate capacitors comprising a plurality of capacitor plates defined by a specific surface area; and an insulating dielectric layer which separates the adjacent capacitor plates, whereby the rotation of the rotatable substructure causes the plurality of magnets and the corresponding magnetic fields to pass above and below the plurality of plate capacitors to generate an electrical potential to drive an electric current.

According to an aspect of the present invention, an integrated wire equivalent wind turbine assembly comprises a base member that includes a central support; a rotatable substructure circumferentially disposed around the central support of the base member, wherein the rotatable substructure comprising a plurality of wind collectors affixed to the periphery of the rotatable substructure, the plurality of wind collectors creating a drag against wind passing the assembly, whereby wind causes the rotatable substructure to rotate; a stator mounted onto the central support of the base member and disposed in a cavity of the rotatable substructure, thereby allowing free rotation of the rotatable substructure around the stator; a plurality of magnets with opposite polarities are disposed on either side of the stator, further the plurality of magnets having alternating north and south poles facing perpendicular to the stator on each side of the stator; and a plurality of wire equivalent sheets are connected to each other and disposed circumferentially around the central support of the base member, wherein each of the wire equivalent sheets is defined by a series of elongated slots disposed along the surface area of the wire equivalent sheets to form a plurality of rectangular wires equivalent along the length of the wire equivalent sheet to form parallel conductors arranged in a closed circuit, whereby the rotation of the rotatable substructure causes the plurality of magnets and the corresponding magnetic fields to pass above and below the wire equivalent conductive sheets to generate an electrical potential to drive an electric current.

In view of the foregoing, it is therefore an objective of the present invention to provide a more cost efficient turbine/generator through more economical design and construction which is more environmentally compatible than current designs.

Another objective is to eliminate the use of conventional round wire windings with their attendant disadvantages.

Another objective is to use less conductive material per unit of electrical energy generated as compared to typical generators composed of wire windings.

Yet another objective is to provide an integrated capacitance wind turbine assembly that uses a stator comprised of parallel plate capacitors wired in such a way as to immediately harness the current generated by the developing potential difference between the plates of the capacitors.

Another objective is to provide an integrated wire equivalent wind turbine assembly that uses sheets of conductive material which are slotted through the full sheet thickness so as to create a stator containing a series of square or rectangular wire equivalents.

Yet another objective is to eliminate the air spaces inherently present between the round wire windings of a standard stator, thereby allowing the wind turbines of the present invention to dissipate heat more effectively so as to reduce the operating temperature and extend the useful life of the generator.

Another objective is to eliminate the use of round wire windings of a standard stator, thereby facilitating simple construction of the turbine assembly of the present invention.

Yet another objective is to provide a compact design of the turbine assembly of the present invention, thereby decreasing inertia resulting in an increased ability to generate electrical current at lower wind speeds.

Another objective is to eliminate the use of large spinning blades with their high tip speed that is noisy and often deadly to flying birds and bats.

Yet another objective is to eliminate the portion of standard round wire windings used to maintain continuity of the winding as the wire passes through a 180° arc while reversing its direction; so as to eliminate a substantial amount of material costs, weight, and space.

Other objectives and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The invention will now be described, by way of example, with reference to the accompanying drawings, in which:

FIG. 9 is an enlarged view of a part 9 of a wire equivalent sheets as illustrated in FIG. 8, in accordance with an embodiment of the present invention; and FIG. 10 is a cross sectional view along line 10-10 of FIG. 9, in accordance with an embodiment of the present invention.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIGS. 1-10. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Figure 2:
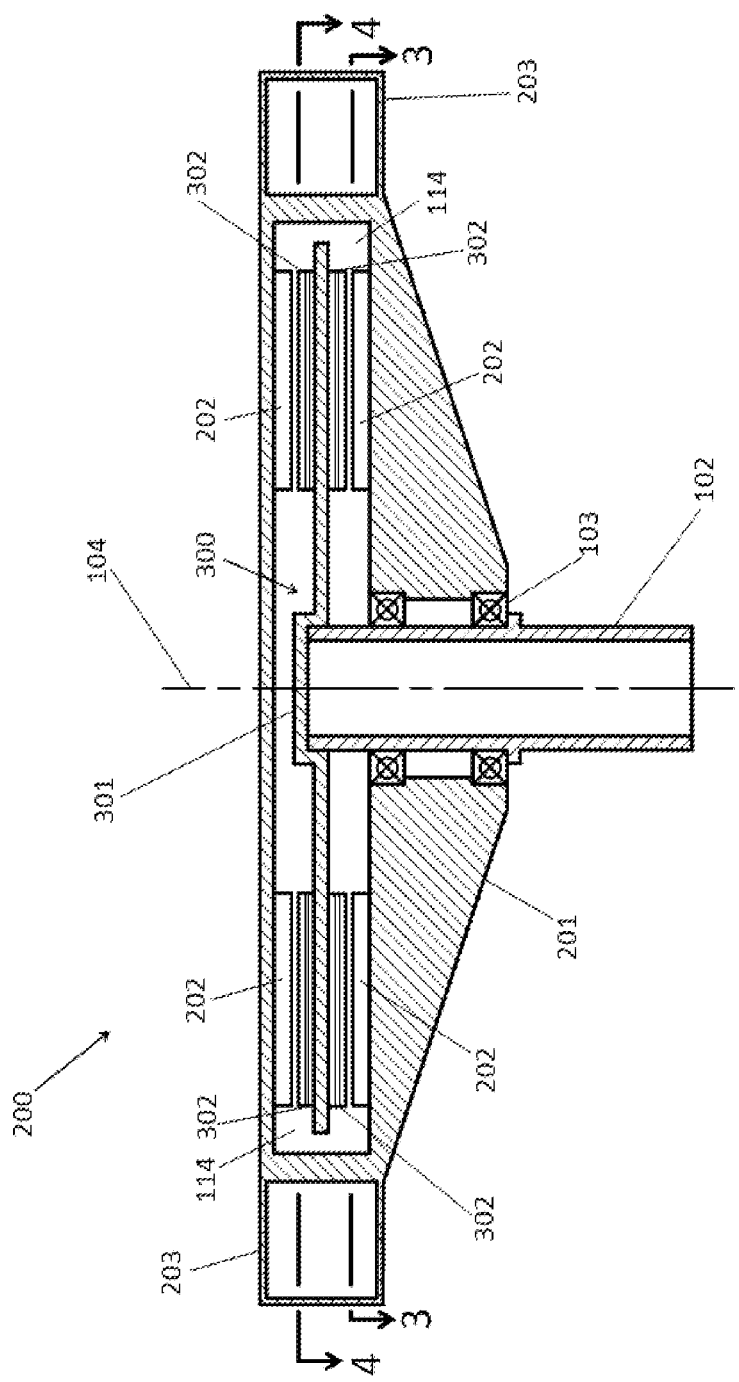
FIG. 2 is a vertical section along line 2-2 through the center of the integrated capacitance wind turbine assembly as shown in FIG. 1, in accordance with an embodiment of the present invention.
Figure 3:
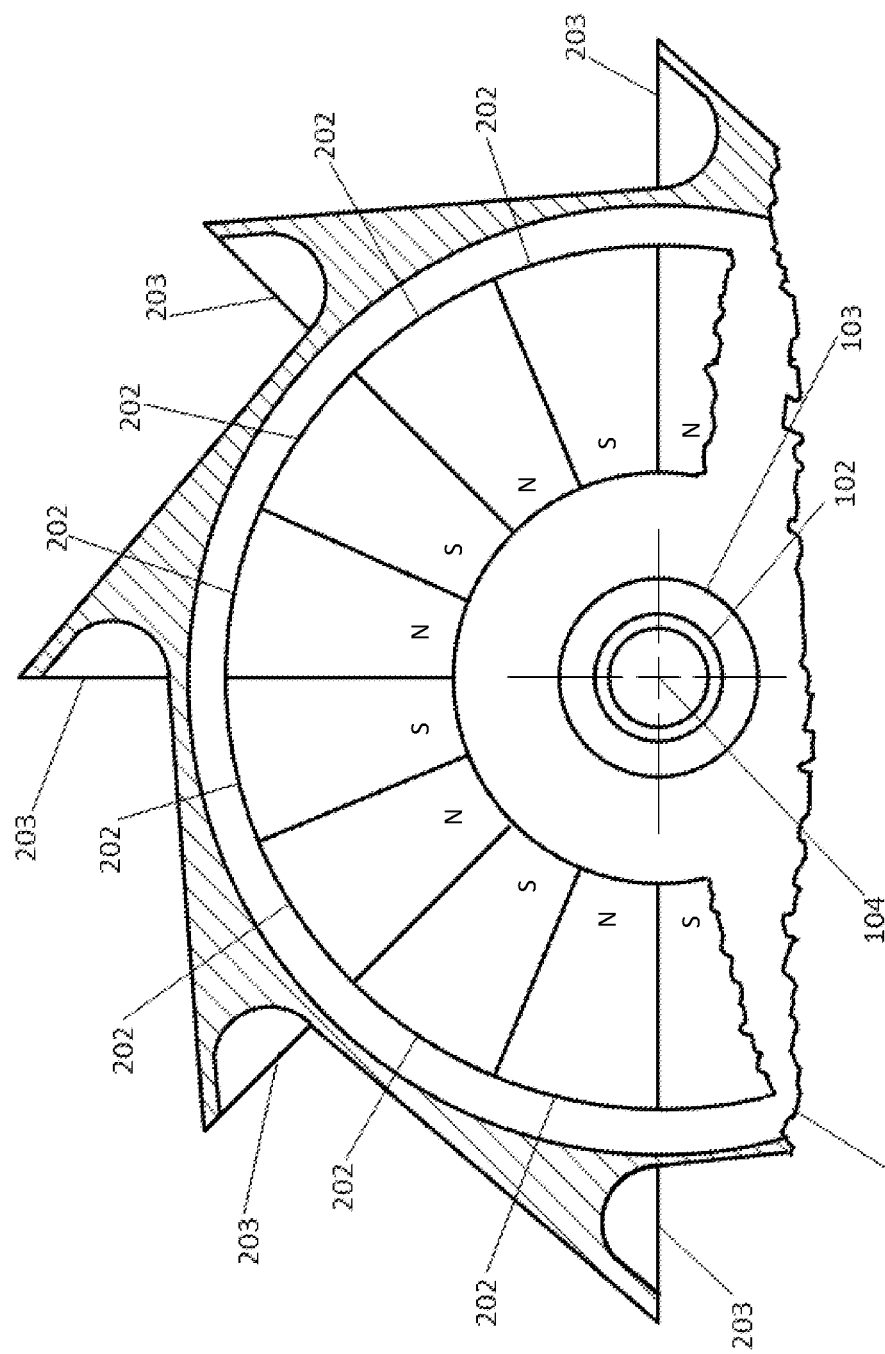
FIG. 3 is a horizontal section along line 3-3 of a rotatable structure face as shown in FIG. 2 showing an arrangement of a plurality of magnets, in accordance with an embodiment of the present invention.
Figure 4:
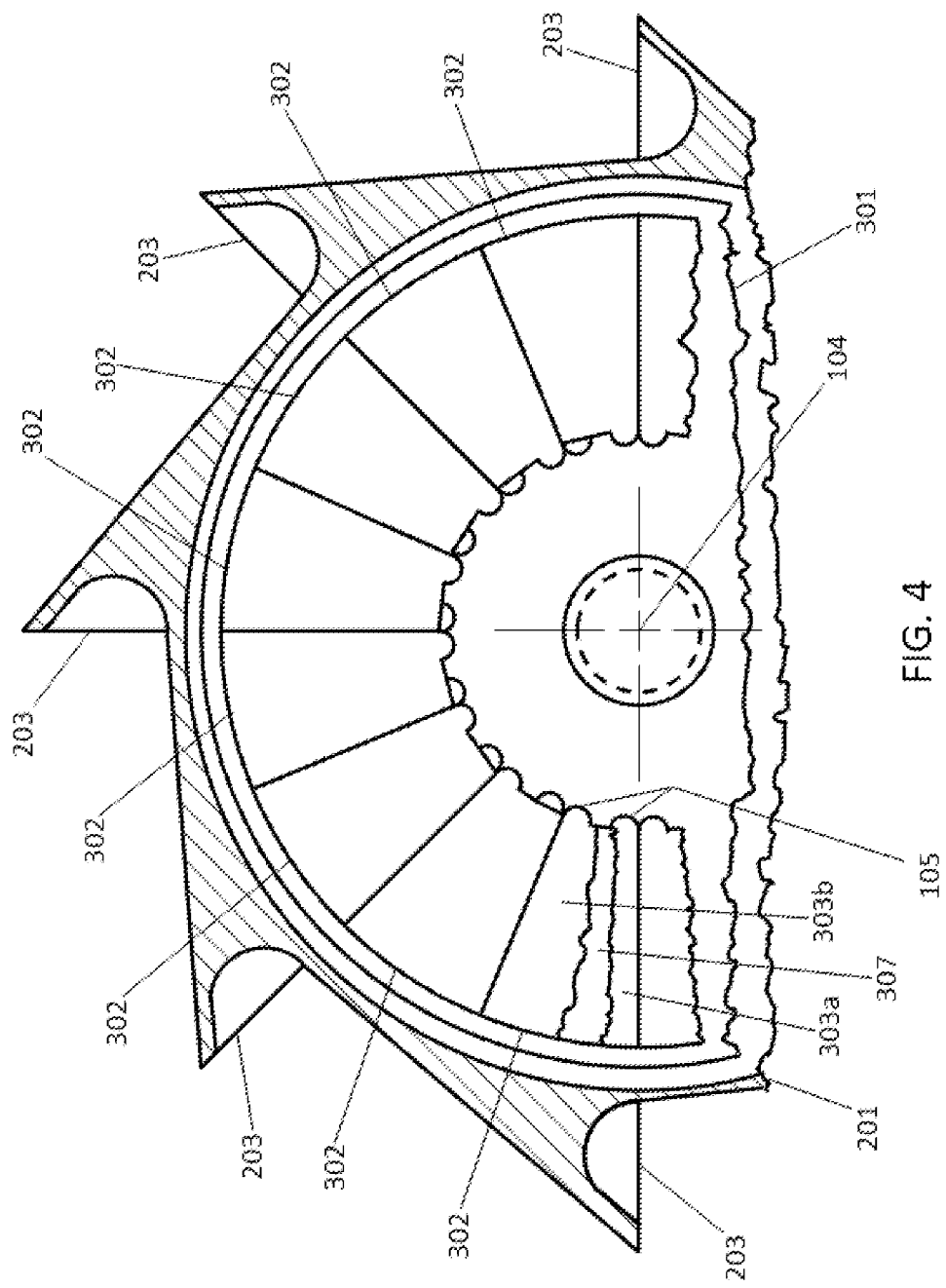
FIG. 4 is a horizontal section along line 4-4 of a stator as shown in FIG. 2 showing an arrangement of a plurality of parallel plate capacitors, in accordance with an embodiment of the present invention.

According to an embodiment of the present invention, an integrated capacitance wind turbine assembly 100 is referenced in FIGS. 1-4. The integrated capacitance wind turbine assembly 100 which is configured to generate electrical current by exposing a plurality of plate capacitors 302 to a passing magnetic field from a plurality of magnets 202 on a rotatable structure 200, such as a rotor. In this manner, a potential difference is generated in the plate capacitors 302, which generates an electrical current. Each plate capacitor 302 is depicted with 2 output pads 105 as shown in FIG. 4 for connection to an output circuit to harness the generated current.

Figure 1:
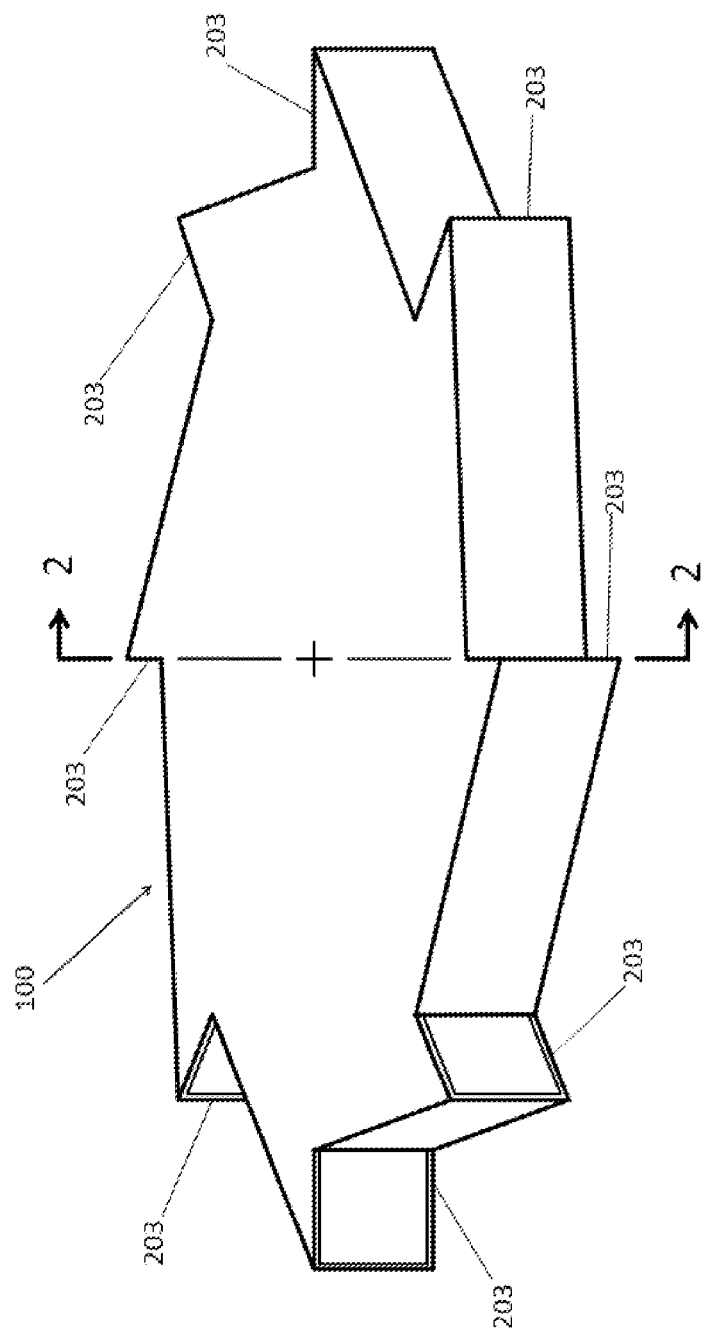
FIG. 1 is a perspective view of an exemplary integrated capacitance wind turbine assembly, in accordance with an embodiment of the present invention.

As shown in FIG. 1 and FIG. 2, the integrated capacitance wind turbine assembly 100 generates electricity by rotating a plurality of magnets 202 as shown in FIG. 3 past a plurality of plate capacitors 302 as shown in FIG. 4. The plate capacitors 302 comprise at least a pair of capacitor plates 303a, 303b and a dielectric 307 in between them as shown in FIG. 4 or they may contain multiple plates with intervening dielectric layers.

In operation, as the magnets 202 rotate past the plate capacitors 302, the plate capacitors 302 begin to generate a voltage potential which drives an electrical current. As the magnets 202 continue rotating the magnet pole directions passing the capacitor reverse causing the current flow to reverse direction thus completing an alternating current cycle. The capacitors 302 may be arranged relative to the magnets to produce a single phase output or any given multiphase output.

In this manner, the plate capacitors 302 work to generate voltage in response to the movement by the rotating magnets 202. The use of magnets 202 and capacitors 302 to generate an electric current is advantageous because it enhances electrical generation efficiency and helps to dissipate heat more readily. Also, by not utilizing electrical windings, material expenses and fabrication costs are reduced.

Looking back at FIG. 1, the rotatable substructure 200 comprises a plurality of wind collectors 203 that are affixed to a periphery of the rotatable substructure 200. The rotatable substructure 200 is mounted onto a mounting structure 201. The wind collectors 203 are configured to provide drag against wind passing the assembly 100, causing the rotatable substructure 200 to rotate in one direction. The wind collectors 203 may include cup-shaped members, irregular cavities, blades, or various planar members that are configured to create drag against the wind. The wind collectors 203 may be fixed, or rotated to regulate the speed of rotation for the rotatable substructure 200.

Each of the magnets 202 has alternating north and south poles facing perpendicular to the stator 300. The magnets 202 are disposed on either side of the stator 300, so as to have opposite polarities. In one possible embodiment, half of the magnets lie below the stator 300, and half of the magnets lie above the stator 300. Furthermore the orientation of the magnetic fields of the magnets 202 is perpendicular to the stator 300.

Referring to FIG. 3, the magnets 202 are disposed around the central axis 104 with alternating north and south orientations. As shown in FIG. 2, which is a cross sectional view along the line 2-2 of the embodiment as illustrated in FIG. 1, the magnets 202 are disposed above and below the stator 300 and are defined by a north face immediately opposite the stator 300 on one side and a south face immediately opposite the stator 300 on the opposite side. Further, the wind turbine assembly 100 further comprises a mounting structure 201 to support the rotatable structure 200 through a plurality of bearings 103.

In operation, as shown in FIG. 3, which is a cross sectional view along the line 3-3 of the embodiment as illustrated in FIG. 2, the magnets 202 rotate over a plurality of plate capacitors 302, the plate capacitors 302 begin to generate a voltage potential which drives an electrical current. As the magnets 202 continue rotating the magnet pole directions passing the capacitor reverse, causing the current flow to reverse direction thus completing an alternating current cycle.

The primary advantage of the assembly 100 is the simplicity of construction. This is a result of not utilizing wire windings, and the use of simple plate capacitors known in the art. Often, the capacitor plates 303a-b of the plate capacitors 302 can be flat and arranged in a stacked arrangement, or curved as in a squirrel cage arrangement. The plate capacitors 302 may be easily stamped out of stock material and if necessary curved as required. In one embodiment, a malleable highly electrically conductive material can be utilized for this purpose.

The capacitor plates 303a-b may be composed of any highly electrically conductive material such as copper or aluminum while the dielectric material 307 is an electrical insulator.

As referenced in FIG. 4, which is a cross sectional view along the line 4-4 of the embodiment as illustrated in FIG. 2, the plate capacitors 302 are disposed on the surface of the stator base plate 301 in a circular pattern. Further, an additional similarly disposed plurality of capacitors 302 is located on the opposite side of the stator base plate 301. By virtue of the location of the capacitors 302 within the alternating magnetic fields of the magnets 202. The motion of the magnets 202 works to continually invert the field orientation experienced by the capacitors 302. This creates a regular alternating electrical potential within the capacitor plates 303a-b, which drives an alternating electrical current. In one embodiment, the plurality of capacitor plates is operatively connected to an output portion 105 that carries the generated electrical current for harnessing.

In addition to providing current generating capacity using plate capacitors 302, the assembly 100 is more capable of dissipating heat created within the stator 300 because the insulating air gaps found in the spaces adjacent to the round wire in windings in traditional generators have been eliminated.

In another embodiment of the present invention, an integrated wire equivalent wind turbine assembly 100' is referenced in FIG. 5-10. The wind turbine assembly 100' is configured to generate electrical current by exposing a plurality of wire equivalent sheets 304 to a passing magnetic field from a plurality of magnets 202 on a rotatable structure 200, such as a rotor. In this manner, a potential difference is generated in the wire equivalent sheets 304, which generates an electrical current. The generated electrical current is then output for harnessing.

Figure 5:
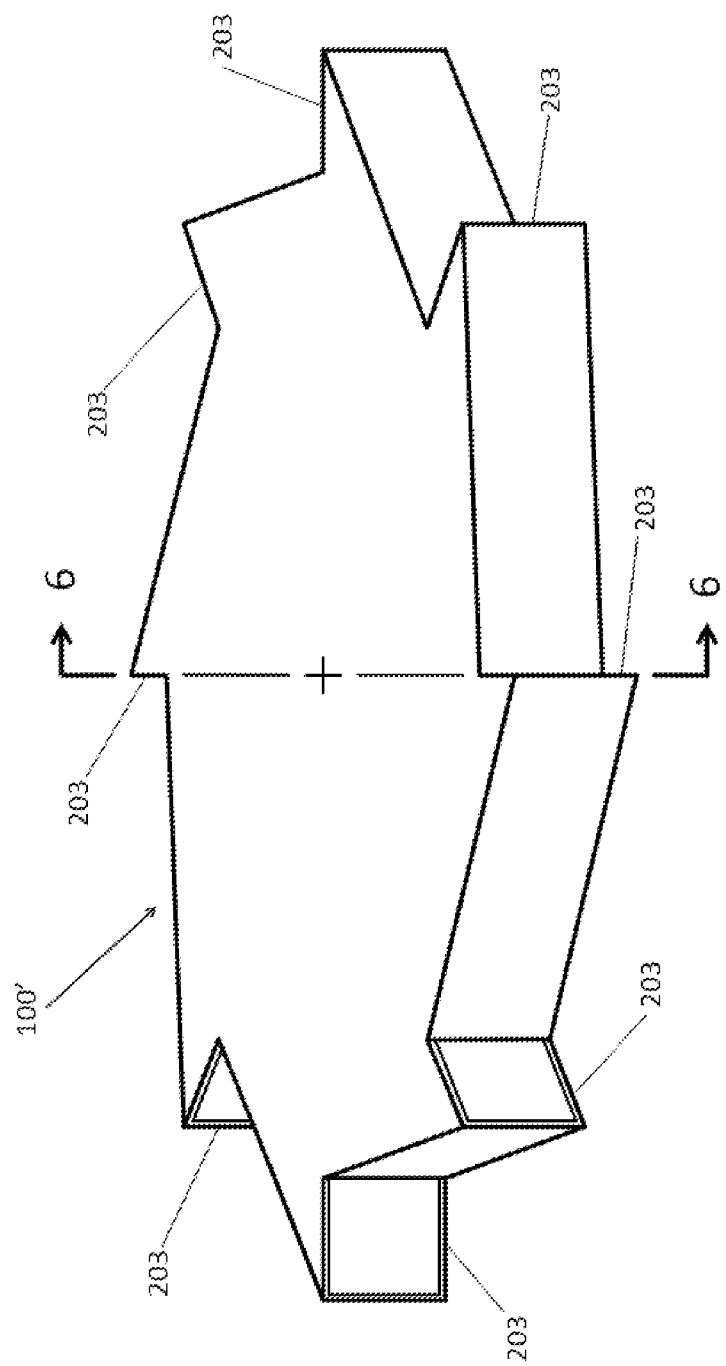
FIG. 5 is a perspective view of an integrated wire equivalent wind turbine assembly, in accordance with an embodiment of the present invention.
Figure 6:
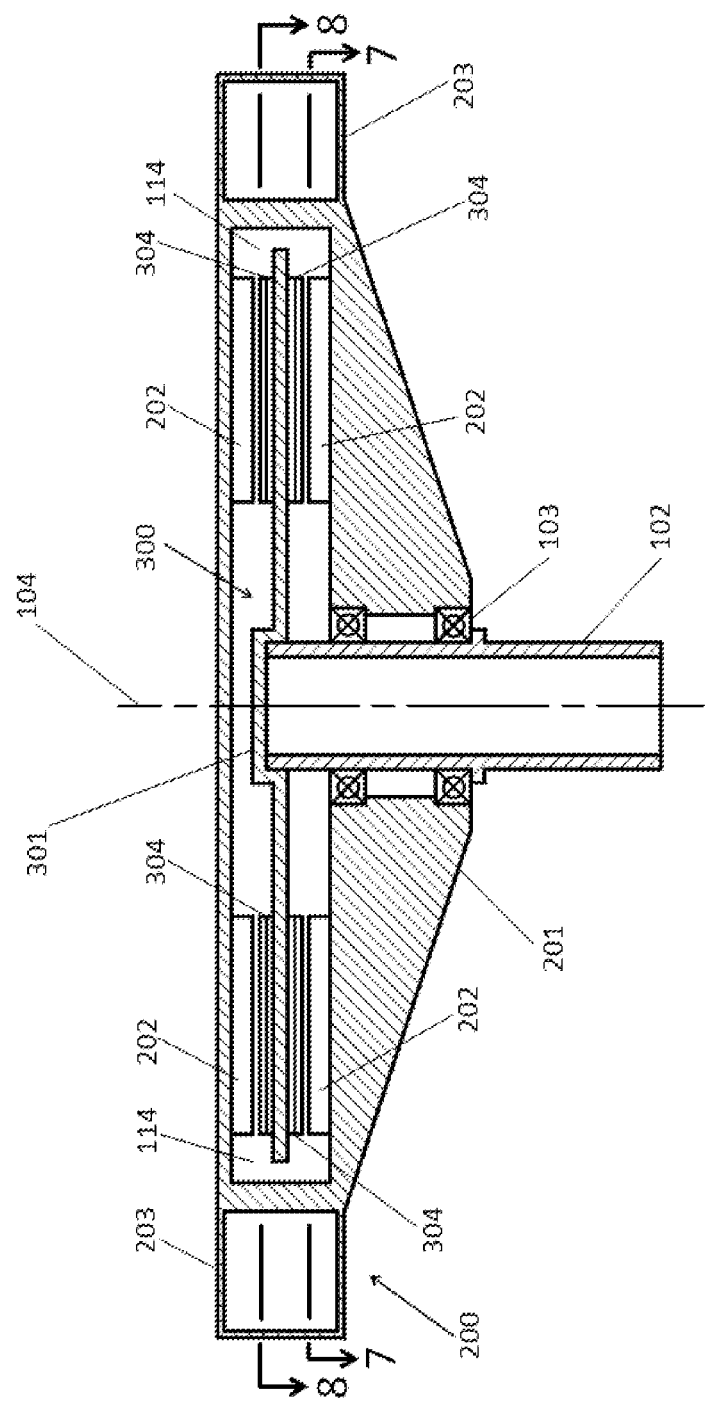
FIG. 6 is a vertical section view along line 6-6 through the center of the integrated wire equivalent wind turbine assembly as shown in FIG. 5, in accordance with an embodiment of the present invention.

As referenced in FIG. 6, which is a cross sectional view along the line 6-6 of the exemplary wind turbine assembly 100' as illustrated in FIG. 5, the wind turbine assembly 100' comprises a base member 102. The base member 102 may include a central support such as a tubular structure that serves as a housing for a stator 300. A central axis 104 extends concentrically from the base member 102. In one embodiment, the central axis 104 extends vertically. The base member 102 may have a generally cylindrical shape. Though other shapes of the base member 102 may be used without departing from the scope and spirit of the present invention.

Turning now to FIG. 5, the wind turbine assembly 100' further comprises a rotatable substructure 200, or a rotor. The rotatable substructure 200 is circumferentially disposed around the base member 102. The rotatable substructure 200 rotates around the central support or central axis 104 of the wind turbine assembly 100' to generate renewable energy. In one embodiment, the rotatable substructure 200 is mounted onto a mounting structure 201, wherein the rotatable substructure 200 rotates parallel to a ground surface.

Figure 7:
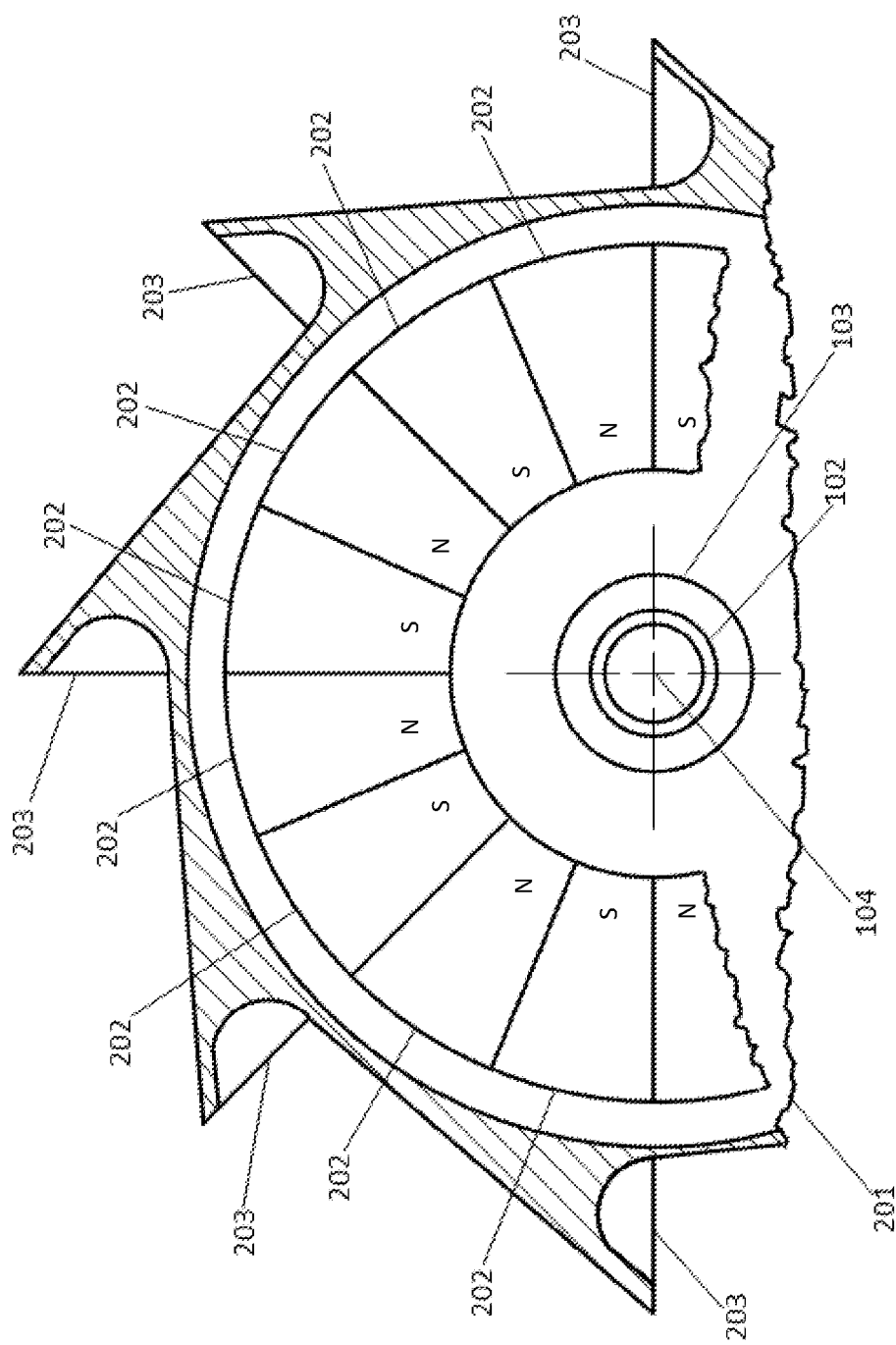
FIG. 7 is a horizontal section view along line 7-7 of a rotatable structure face as shown in FIG. 6 showing arrangement of plurality of magnets, in accordance with an embodiment of the present invention.
Figure 8:
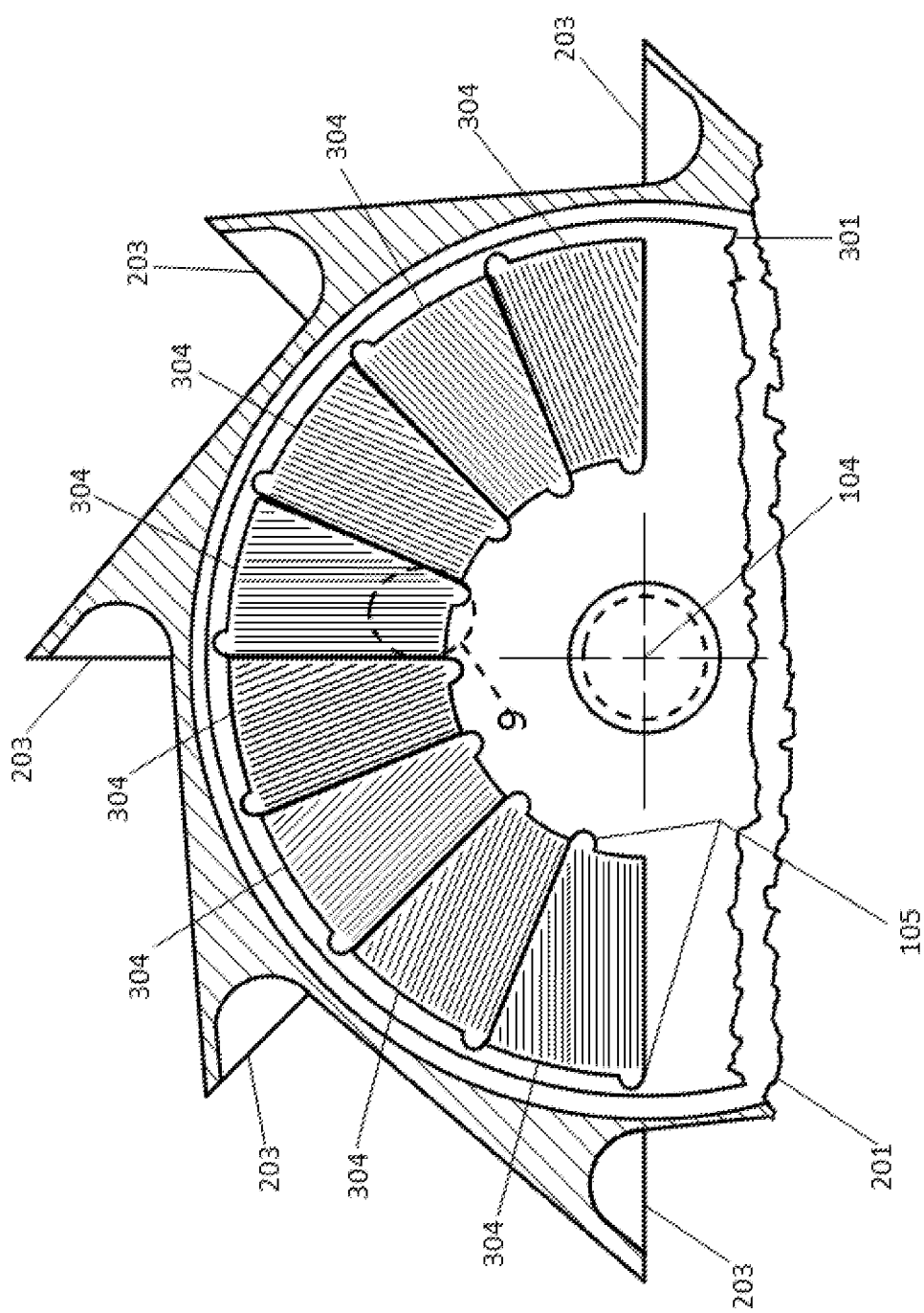
FIG. 8 is a horizontal section view along line 8-8 of a stator, as shown in FIG. 6 showing arrangement of plurality of wire equivalent sheets, in accordance with an embodiment of the present invention.

As FIGS. 5, 7, and 8 show, the rotatable substructure 200 has a plurality of wind collectors 203 affixed to a periphery of the rotatable substructure 200 to provide drag against wind passing the wind turbine assembly 100', so as to rotate the rotatable substructure 200. The wind collectors 203 may include cup-shaped members, or planar members that are configured to create drag against the wind. The wind collectors 203 may be fixed, or can be detachably attached, so as to be rotated to regulate the speed of rotation of the rotatable substructure 200.

As illustrated in FIG. 6, the wind turbine assembly 100' also includes a stator 300. The stator 300 is the stationary portion of the wind turbine assembly 100'. The stator 300 is defined within cavity 114. The cavity 114 is sized and dimensioned to enable free rotation of the rotatable substructure 200 around the stator 300 while the stator 300 is placed within the cavity 114. Further, the wind turbine assembly 100' further comprises a mounting structure 201 to support the rotatable structure 200 through a plurality of bearings 103.

As FIG. 7 provides a cross sectional view along the line 7-7 of the embodiment as illustrated in FIG. 6, the wind turbine assembly 100' further comprises a plurality of magnets 202 affixed to the rotatable substructure 200. The rotation of the rotatable substructure 200 rotates the magnets 202 and their corresponding magnetic fields then pass through the stator 300 containing a plurality of wire equivalent sheets 304 acting as electrical windings to generate an electrical current in response to the rotation by the magnets 202. Each of the magnets 202 has alternating north and south poles facing perpendicular to the stator 300. The magnets 202 are disposed on either side of the stator 300, so as to have opposite polarities. In one possible embodiment, half of the magnets 202 lie below the stator 300, and half of the magnets 202 lie above the stator 300. Furthermore the orientation of the magnetic fields of the magnets 202 is perpendicular to the stator 300.

As shown in FIG. 8, which illustrates a cross sectional view along the line 8-8 of the embodiment as illustrated in FIG. 6, the turbine assembly 100 comprising the plurality of wire equivalent sheets 304 acting as electrical windings disposed in the cavity 114 of the rotor 200. The electrical windings formed by the plurality of wire equivalent sheets 304 can be connected in any combination of series or parallel connections. In operation, as the magnets 202 rotate past the wire equivalent sheets 304, the wire equivalent sheets 304 generate an electrical current in a process identical to that seen in conventional wire windings. The wire equivalent sheets 304 may be flat or curved and may be arranged relative to the magnets 202 to produce a single phase output or any given multiphase output. Suitable materials for the wire equivalent sheets 304 may include, for example copper or aluminum.

In this manner, the wire equivalent sheets 304 work to generate voltage in response to the movement by the rotating magnets 202. The use of magnets 202 and wire equivalent sheets 304 to generate an electric current is advantageous because it enhances electrical generation efficiency and helps to dissipate heat more readily. Also, by not utilizing electrical windings, material expenses and fabrication costs are reduced.

Turning now to FIG. 9, which provides an enlarged view of a part 9 of a wire equivalent sheet 304 as illustrated in FIG. 8, wherein each of the wire equivalent sheets 304 is defined by a series of elongated slots 305. The slots 305 are disposed along the length of the wire equivalent sheets 304, covering a substantial portion of the surface area of the wire equivalent sheets 304. In one embodiment, the series of elongated slots 305 are disposed in a generally parallel relationship; however the slots 305 may be arranged in a non-parallel configuration. Further, the slots can have varying lengths.

In one embodiment, each slot 305 is laser cut into the wire equivalent sheets 304 although any appropriate cutting process can be used. It is significant to note that the thinner the cut the more material remains to create and conduct the electrical current.

Further, as illustrated in FIG. 9, the plurality of elongated slots 305 segregate the wire equivalent sheets 304 into a plurality of rectangular wires 306, or wire equivalents. A cross sectional cut at 10-10 of FIG. 9 is illustrated in FIG. 10, which shows the rectangular wires 306 from the wire equivalent sheets 304 of FIG. 9, extending along the length of the sheet 304. In some embodiments, the slots 305 segregate the wire equivalent sheets 304 into rectangular or square shaped wires 306.

In essence, sheets 304 of conducting material are formed into multiple sets of rectangular or square wires 306 that carry electrical current across the length of the sheets 304. In any case, the rectangular or square wires 306 substantially fill the space allocated for the stator 300. The use of rectangular or square wires 306 is a more efficient arrangement than the less complete filling of the stator space for conventional windings of round magnet wire.

In one aspect, an integrated capacitance wind turbine assembly 100, the assembly 100 comprises a base member 102 comprising a central support having a central axis 104; a rotatable substructure 200 circumferentially disposed around the central support of the base member 102, wherein the rotatable substructure 200 comprising a plurality of wind collectors 203 affixed to the periphery of the rotatable substructure 200, the plurality of wind collectors 203 creating a drag against wind passing the assembly 100, whereby wind causes the rotatable substructure 200 to rotate; a stator 300 mounted onto the central support of the base member 102 and is disposed in a cavity 114 of the rotatable substructure 200, thereby allowing free rotation of the rotatable substructure 200 around the stator 300; a plurality of magnets 202 with opposite polarities are disposed on either side of the stator 300, further the plurality of magnets 202 having alternating north and south poles facing perpendicular to the stator 300 on each side of the stator 300; a plurality of parallel plate capacitors 302 connected to each other and disposed on the surface of the stator base plate 301, wherein the parallel plate capacitors 302 comprising a plurality of capacitor plates 303a-b defined by a specific surface area; and an insulating dielectric layer 307 which separates the adjacent capacitor plates 303a-b, whereby the rotation of the rotatable substructure 200 causes the plurality of magnets 202 and the corresponding magnetic fields to pass above and below the plurality of plate capacitors 302 to generate an electrical potential to drive an electric current.

According to another aspect, the capacitor plates 303a-b of the capacitors 302 are disposed in a generally parallel relationship.

According to another aspect, the capacitor plates 303a-b are fabricated from a highly electrically conductive material such as copper or aluminum.

According to another aspect, the integrated capacitance wind turbine assembly 100 comprises an output portion 105 operatively connected to the plurality of capacitors 302, the output portion 105 carrying the generated electrical current.

According to another aspect, the plurality of capacitors 302 can be arranged and wired so as to provide a single phase output or any specific multiphase output.

According to another aspect of the present invention, an integrated wire equivalent wind turbine assembly 100' comprises a base member 102 comprising a central support having a central axis 104; a rotatable substructure 200 circumferentially disposed around the central support of the base member 102, wherein the rotatable substructure 200 comprising a plurality of wind collectors 203 affixed to the periphery of the rotatable substructure 200, the plurality of wind collectors 203 creating a drag against wind passing the assembly 100', whereby wind causes the rotatable substructure 200 to rotate; a stator 300 mounted onto the central support of the base member 102 and is disposed in a cavity 114 of the rotatable substructure 200, thereby allowing free rotation of the rotatable substructure 200 around the stator 300; a plurality of magnets 202 with opposite polarities are disposed on either side of the stator 300, further the plurality of magnets 202 having alternating north and south poles facing perpendicular to the stator 300 on each side of the stator 300; and a plurality of wire equivalent sheets 304 are connected to each other and disposed circumferentially around the central support of the base member 102, wherein each of the wire equivalent sheets 304 is defined by a series of elongated slots 305 disposed along the surface area of the wire equivalent sheets 304 to form a plurality of rectangular wires equivalent 306 along the length of the wire equivalent sheet 304 to form parallel conductors arranged in a closed circuit, whereby the rotation of the rotatable substructure 200 causes the plurality of magnets 202 and the corresponding magnetic fields to pass above and below the wire equivalent conductive sheets 304 to generate an electrical potential to drive an electric current.

According to another aspect, the wire equivalent conductive sheets 304 are fabricated from a highly electrically conductive material such as copper or aluminum.

According to another aspect, the plurality of wire equivalent conductive sheets 304 are planar and are arranged relative to the magnets 202 to produce a single phase output or multiphase output.

According to another aspect, each of the elongated slots 305 may be laser cut into the wire equivalent sheets 304.

According to another aspect, the base members 102 of each of the wind turbine assemblies 100, 100' are fixedly attached to a mount structure 201.

According to another aspect, the base members 102 of the wind turbine assemblies 100, 100' are generally circular in shape.

According to another aspect, the rotatable substructure 200 of the wind turbine assemblies 100, 100' is perpendicularly disposed in relation to the central support of the base member 102.

According to another aspect, the turbine assembly 100, 100' and an electrical generator are integrated into a single component assembly.

According to another aspect, the quantity of the plurality of magnets 202 used in the wind turbine assemblies 100, 100' are of even numbers.

According to another aspect, the wind turbine assemblies 100, 100' further comprise a mounting structure 201 to support the rotatable structure 200 through a plurality of bearings 103.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An integrated capacitance wind turbine assembly, the assembly comprising:
   a base member comprising a central support;
   a rotatable substructure circumferentially disposed around the central support of the base member, wherein the rotatable substructure comprises a plurality of wind collectors affixed to a periphery of the rotatable substructure, the plurality of wind collectors creating a drag against wind passing the assembly, whereby wind causes the rotatable substructure to rotate;
   a stator mounted onto the central support of the base member and is disposed in a cavity of the rotatable substructure, thereby allowing free rotation of the rotatable substructure around the stator;
   a first plurality of planar magnets with opposite polarities are disposed in side-by-side relationship to each other on a first side of the stator and each magnet of the first plurality of planar magnets lies flat in a first common plane on the first side of the stator, further each magnet of the first plurality of planar magnets having alternating north and south poles facing perpendicular to the stator on the first side of the stator;
   a second plurality of planar magnets with opposite polarities are disposed in side-by-side relationship to each other on a second side of the stator and each magnet of the second plurality of planar magnets lies flat in a second common plane on the second side of the stator, further each magnet of the second plurality of planar magnets having alternating north and south poles facing perpendicular to the stator on the second side of the stator;
   a first plurality of parallel plate capacitors connected to each other and disposed on a first surface of a stator base plate, wherein the first plurality of parallel plate capacitors comprises a first plurality of parallel plates defined by a specific surface area;
   a second plurality of parallel plate capacitors connected to each other and disposed on a second surface of the stator base plate, wherein the second plurality of parallel plate capacitors comprises a second plurality of parallel plates defined by a specific surface area; and
   an insulating dielectric layer which separates each of the first plurality of parallel plates and the second plurality of parallel plates, whereby the rotation of the rotatable substructure causes each of the plurality of magnets and the corresponding magnetic fields to pass above and below the plurality of parallel plate capacitors to generate an electrical potential to drive an electric current.

2. The assembly of claim 1, wherein the first plurality of parallel plates of the first plurality of parallel plate capacitors are disposed in side-by-side relationship to each other and the second plurality of parallel plates of the second plurality of parallel plate capacitors are disposed in side-by-side relationship to each other.

3. The assembly of claim 1, wherein the base member fixedly attaches to a mount structure.

4. The assembly of claim 1, wherein the base member is generally circular in shape.

5. The assembly of claim 1, wherein the rotatable substructure is perpendicularly disposed in relation to the central support of the base member.

6. The assembly of claim 1, wherein the first plurality of parallel plates of the first plurality of parallel plate capacitors and the second plurality of parallel plates of the second plurality of parallel plate capacitors are each fabricated from a highly electrically conductive material selected from the group consisting of copper and aluminum.

7. The assembly of claim 1, wherein the turbine assembly and an electrical generator are integrated into a single component assembly.

8. The assembly of claim 1, wherein the quantity of each of the first plurality of planar magnets and the second plurality of planar magnets is an even number.

9. The assembly of claim 1, wherein the assembly further comprises a mounting structure to support the rotatable substructure through a plurality of bearings.

10. The assembly of claim 1, wherein the assembly further comprises an output portion operatively connected to each of the first plurality of parallel plate capacitors and the second plurality of parallel plate capacitors, the output portion carrying the generated electrical current.

11. The assembly of claim 1, wherein the plurality of parallel plate capacitors can be arranged and wired so as to provide a single phase output or any specific multiphase output.

12. An integrated wire equivalent wind turbine assembly, the assembly comprising:
- a base member comprising a central support;
- a rotatable substructure circumferentially disposed around the central support of the base member, wherein the rotatable substructure comprises a plurality of wind collectors affixed to the periphery of the rotatable substructure, the plurality of wind collectors creating a drag against wind passing the assembly, whereby wind causes the rotatable substructure to rotate;
- a stator mounted onto the central support of the base member and is disposed in a cavity of the rotatable substructure, thereby allowing free rotation of the rotatable substructure around the stator;
- a first plurality of planar magnets with opposite polarities are disposed in side-by-side relationship to each other on a first side of the stator and each magnet of the first plurality of planar magnets lies flat in a first common plane on the first side of the stator, further each magnet of the first plurality of planar magnets having alternating north and south poles facing perpendicular to the stator on the first side of the stator;
- a second plurality of planar magnets with opposite polarities are disposed in side-by-side relationship to each other on a second side of the stator and each magnet of the second plurality of planar magnets lies flat in a second common plane on the second side of the stator, further each magnet of the second plurality of planar magnets having alternating north and south poles facing perpendicular to the stator on the second side of the stator;
- a plurality of wire equivalent sheets are connected to each other and disposed circumferentially around the central support of the base member, wherein each of the wire equivalent sheets is defined by a series of elongated slots disposed along the surface area of the wire equivalent sheets to form a plurality of rectangular wires equivalent along the length of the wire equivalent sheet to form parallel conductors arranged in a closed circuit, whereby the rotation of the rotatable substructure causes the first plurality of planar magnets and the second plurality of planar magnets and the corresponding magnetic fields to pass above and below the wire equivalent sheets to generate an electrical potential to drive an electric current.

13. The assembly of claim 12, wherein the base member fixedly attaches to a mount structure.

14. The assembly of claim 12, wherein the base member is generally circular in shape.

15. The assembly of claim 12, wherein the wire equivalent sheets are fabricated from a highly electrically conductive material selected from the group consisting of copper and aluminum.

16. The assembly of claim 12, wherein the quantity of each of the first plurality of planar magnets and the second plurality of planar magnets is an even number.

17. The assembly of claim 12, wherein the integrated wire equivalent wind turbine assembly further comprises a mounting structure to support the rotatable substructure through a plurality of bearings.

18. The assembly of claim 12, wherein the assembly further comprises an output portion operatively connected to the plurality of wire equivalent sheets, the output portion carrying the generated electrical current.

19. The assembly of claim 12, wherein the plurality of wire equivalent sheets is planar and is arranged relative to the first plurality of planar magnets and the second plurality of planar magnets to produce a single phase output or multiphase output.

20. The assembly of claim 12, wherein each of the elongated slots is cut into the wire equivalent sheets using laser cutting or other methods.

* * * * *